3,317,920
COPOLYMERIZATION OF ALKYLENE
SULFIDES
Manfred Sander, Frankfurt am Main, Germany, assignor, by mesne assignments, to Mobil Oil Corporation, a corporation of New York
No Drawing. Filed Dec. 18, 1963, Ser. No. 331,394
2 Claims. (Cl. 260—79)

The present invention relates to novel copolymers of lower molecular weight alkylene sulfides and, more particularly, to such copolymers of ethylene sulfide and propylene sulfide.

High molecular weight poly (ethylene sulfide) in the form of a highly crystalline solid having a relatively high melting point (e.g., about 210° C.) can, for example, be prepared by polymerizing ethylene sulfide in presence of an alkali metal. Such polymers are insoluble in many organic solvents up to temperatures of approximately 150° C. On the other hand, high molecular weight poly (propylene sulfides) are soft, elastomeric substances that are soluble in many organic solvents and, therefore, possess substantially different characteristics than poly (ethylene sulfide). Other poly (alkylene sulfides), prepared from alkylene sulfides of higher molecular weight than propylene sulfide, as for example, butylene sulfide, generally possess properties similar to poly (propylene sulfide). Thus, for particular applications, it is desirable to have available copolymers of sulfides (such as those of ethylene sulfide and propylene sulfide) that, as compared to the individual polymers of said components, possess substantially the desired properties of each of said individual polymers.

In accordance with this invention, it has been discovered that copolymers, rather than mixtures of poly (alkylene sulfides), can be prepared by polymerizing a mixture of lower molecular weight alkylene sulfides containing from two to four carbon atoms, particularly ethylene sulfide and propylene sulfide, in presence of an alkali metal.

Although the present invention embodies copolymers prepared by copolymerizing the mixture of alkylene sulfides in any proportion, in preferred embodiment, it relates to copolymers prepared by copolymerizing such a mixture containing from about 10 to 90% of one of the monomeric alkylene sulfides.

By the process embodied herein, and illustrated by copolymerization of ethylene sulfide and propylene sulfide, there can, for example, be prepared copolymers containing more than 50% ethylene sulfide that are solids and, as compared to poly (ethylene sulfide), are of lower melting point, more elastic, less crystalline, and of higher impact strength. Copolymers can also be prepared, containing less than 30% ethylene sulfide that are rubber-like and, as compared to poly (propylene sulfide), have a higher tensile strength and lower elongation. In general, the copolymers embodied herein exhibit a decreased and less sharp melting temperature as the proportion of propylene sulfide:ethylene sulfide is increased. Variations in physical properties of copolymers embodied herein, as a function of the ratio of the copolymerizable components, is shown by the data in the following tabulation in which the designation ES stands for ethylene sulfide and PrS for propylene sulfide.

| Weight Ratio of Reactants | | Melting Temperature, °C. | Solubility in— | | | | | | Sulfur Content |
|---|---|---|---|---|---|---|---|---|---|
| ES | PrS | | Tetrahydrofuran | Benzene | Chloroform | Dioxane | Dimethyl formamide | Dimethyl sulfoxide | |
| 100 | ---------- | 210 | — | — | — | — | — | >160° C. | 52.3 |
| 90 | 10 | 188-193 | — | — | — | — | >145° C. | >150° C. | 51.9 |
| 75 | 25 | 165-175 | — | — | — | — | >130° C. | >130° C. | 50.4 |
| 50 | 50 | 115-135 | — | — | + | + | >70° C. | >115° C. | 48.1 |
| 25 | 75 | (*) | — | + | + | + | + | >125° C. | 45.4 |
| 10 | 90 | (*) | + | + | + | + | + | >135° C. | 44.7 |
| ---------- | 100 | (*) | + | + | + | + | + | >145° C. | 42.1 |

*Elastomeric soft.

That the compositions for which data are set forth in the foregoing tabulation are copolymers, rather than a mixture of poly (ethylene sulfide) and poly (propylene sulfide), is evidenced by the fact that polymer fractions, obtained by partial dissolution or partial precipitation from solutions, show sulfur contents similar to the unfractionated polymers; and, in view of the extreme differences in solubility characteristics of poly (ethylene sulfide) and poly (propylene sulfide), mixtures thereof rather than copolymers would permit a substantially quantitative separation upon solvent extraction.

The copolymerization reaction embodied herein can be carried out by cationic or anionic polymerization using an alkali metal in the form of the metal itself or a highly basic compound thereof. Although the copolymerization reaction can be carried out with relatively larger amounts of the copolymerization initiator (i.e., alkali metal), it usually is carried out with an amount of alkali metal that does not exceed about one percent, based on the weight of the reactants to be copolymerized, and preferably with an alkali metal concentration of from about 1.0 to about 0.01%, or less. Furthermore, the copolymerization reaction is preferably carried out in presence of an inert liquid reaction medium, preferably a polar solvent, and examples of which include ketones such as acetone and methylethyl ketone, and other organic compounds such as dimethyl formamide, dimethyl sulfoxide, and others.

Desirably, the copolymerization reaction is carried out with use of the alkali metal catalyst in finely divided or dispersed form as, for example, as powdered metal, granular metal, metal chips, metallic films on carriers, etc. The reaction can also be carried out with the catalyst metal dissolved in a suitable solvent and, for example, a solution of sodium in liquid ammonia. Examples of alkali metals for use in practice of this invention include sodium, potassium, rubidium and cesium with sodium being a preferred embodiment.

The desired copolymerization reaction can be carried out at room temperature or at temperatures below or above room temperature (about 20° C.). If elevated temperatures are employed, it is advisable to run the reaction in a sealed vessel involving techniques conventional with other polymerization reactions within the skill of the art.

In order to further describe the invention, the following are set forth for purposes of illustration and not limitation:

Example 1

A solution of 5 grams of ethylene sulfide and 5 grams propylene sulfide in 100 ml. acetone was treated with 18 mg. sodium (in the form of a 10% dispersion in toluene). After about 2 minutes polymerization started in an exothermic reaction resulting in the granular precipitation of a copolymer insoluble in acetone. After 1 hour water and some hydrochloric acid were added, then the polymer was filtered, washed with 10 percent hot hydrochloric acid and subsequently with large quantities of hot water and finally dried at 45° C. 9.5 grams of an elastic polymer was obtained, which melted between 115 and 135° C., was insoluble in petroleum ether, ether, methanol, ethanol, acetone, benzene, sparingly soluble in tetrahydrofuran and soluble in chloroform, dioxane, dimethyl formamide, dimethyl sulfoxide. The reduced viscosity (=viscosity number) of a 0.5 percent solution in dimethyl sulfoxide at 175° C. was 22 cm.$^3$g.$^{-1}$. The sulfur content of the substance amounted to 48.1 percent.

2 grams of the substance was boiled for 15 minutes with 50 ml. chloroform whereby 1.1 grams dissolved. The solution was evaporated to a residue that contained 47.8 percent sulfur; the undissolved substance contained 48.0 percent sulfur.

Example 2

A solution of 2.5 grams ethylene sulfide and 7.5 grams propylene sulfide in 50 ml. acetone was treated with 17 mg. sodium (in the form of a 10% dispersion in toluene) and stirred for 1 hour. Subsequently the mixture was refluxed for 30 minutes. After distilling off the acetone, the residue was dissolved in benzene and the benzene solution washed with dilute hydrohloric acid and water and finally evaporated. 8.7 grams of a soft, elastomeric solid was obtained which was soluble in chloroform, dioxane and dimethyl formamide. The substance dissolved in dimethyl sulfoxide above 125° C. The reduced viscosity of a 0.5 percent solution in dimethyl sulfoxide at 175° C. was 48 cm.$^3$g.$^{-1}$. The substance contained 45.4 percent sulfur.

Example 3

As described in Example 2, 1 gram ethylene sulfide and 9 grams propylene sulfide were polymerized in 50 ml. acetone in the presence of 16 mg. sodium. 8.7 grams of a elastomeric polymer containing 44.7 percent sulfur was obtained. The reduced viscosity in dimethyl sulfoxide at 175° C. amounted to 19 cm.$^3$g.$^{-1}$.

Example 4

As described in Example 1, 8.25 grams ethylene sulfide and 2.75 grams propylene sulfide were polymerized in 100 ml. acetone in the presence of 19 mg. sodium. 10.3 grams of a colorless, fine powder was obtained as polymer, which melted between 165 and 175° C. The substances contained 50.4 percent sulfur. The reduced viscosity in dimethyl sulfoxide at 175° C. was 25 cm.$^3$g.$^{-1}$. The substance was insoluble in benzene, tetrahydrofuran, chloroform and dioxane, and soluble in boiling dimethyl formamide and, above 130° C. in dimethyl sulfoxide.

Example 5

As described in Example 1, 9 grams ethylene sulfide and 1 gram propylene sulfide were polymerized to 100 ml. acetone in the presence of 19 mg. sodium. 8.8 grams of a colorless, fine powder was obtained, which melted between 188 and 193° C. The substance contained 51.9 percent sulfur. The reduced viscosity of a 0.5 percent solution in dimethyl sulfoxide at 175° C. amounted to 22 cm.$^3$g.$^{-1}$.

The copolymers embodied herein can be processed to desired shapes by methods generally used for thermoplastic materials, for example, by compression molding, extrusion molding, or injection molding. Fillers, pigments, coloring matter or other additives can be admixed with the polymer. Processing of the copolymeric products embodied herein in the form of melts are preferred for formation of shaped structures such as films or fibers which, depending on the relative proportions of the monomeric sulfides employed for the copolymerization, possess desired properties such as resistance to chemical attack and, especially, against attack by acids such as hydrochloric acid and alkaline solutions.

Although the present invention has been described with preferred embodiments, it is to be understood that modifications and variations may be resorted to, without departing from the spirit and scope of this invention, as those skilled in the art will readily understand. Such variations and modifications are considered to be within the purview and scope of the appended claims.

What is claimed is:

1. A process for preparing copolymers of lower molecular weight alkylene sulfides which comprises copolymerizing a mixture of alkylene sulfides containing from two to four carbon atoms in an inert polar organic liquid reaction medium and in the presence of an alkali metal.

2. A process according to claim 1 in which said alkali metal is sodium.

References Cited by the Examiner

UNITED STATES PATENTS

| | | | |
|---|---|---|---|
| 2,183,860 | 12/1939 | Coltof | 260—79 |
| 2,185,660 | 1/1940 | Coltof et. al. | 260—79 |
| 3,071,593 | 1/1963 | Warner | 260—79 |
| 3,222,324 | 12/1965 | Brodoway | 260—79 |
| 3,222,325 | 12/1965 | Brodoway | 260—327 |
| 3,222,326 | 12/1965 | Brodoway | 260—327 |

OTHER REFERENCES

Gaylord: Polyethers, "Polyalkylene Sulfides and Other Polythioethers," Part III, vol. XIII, 1962, John Wiley and Sons, New York, pages 6 and 7.

Tucker et al.: "Cyclic and Polymeric Compounds from the Reactions of Ethylene Mercaptan With Polymethylene Halides," American Chemical Society Journal, vol. 55, pages 775 to 781, (1933).

Meadow et al.: "Ring Compounds and Polymers from Polymethylene Dihalides and Dimercaptans," American Chemical Society Journal, vol. 56, 1934, pages 2177 to 2180.

DONALD E. CZAJA, *Primary Examiner.*

LEON J. BERCOVITZ, M. I. MARQUIS,
*Assistant Examiners.*